United States Patent
Kawamura

(10) Patent No.: US 8,675,223 B2
(45) Date of Patent: Mar. 18, 2014

(54) IMAGE FORMING DEVICE, IMAGE FORMING SYSTEM AND COMPUTER READABLE MEDIUM FOR INSTALLING RELATED SOFTWARE TO ANOTHER DEVICE

(75) Inventor: Kenichi Kawamura, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 526 days.

(21) Appl. No.: 12/505,162

(22) Filed: Jul. 17, 2009

(65) Prior Publication Data

US 2010/0033747 A1 Feb. 11, 2010

(30) Foreign Application Priority Data

Aug. 6, 2008 (JP) ................................. 2008-203527

(51) Int. Cl.
*G06K 15/00* (2006.01)
*G06F 3/00* (2006.01)
*G06F 9/44* (2006.01)

(52) U.S. Cl.
USPC ........ 358/1.15; 358/1.13; 358/1.16; 719/321; 719/327

(58) Field of Classification Search
None
See application file for complete search history.

(56) References Cited

U.S. PATENT DOCUMENTS

| 8,144,358 B1* | 3/2012 | Montierth et al. ........... 358/1.16 |
| 2003/0048473 A1* | 3/2003 | Rosen .......................... 358/1.15 |
| 2003/0051069 A1* | 3/2003 | Iida ............................... 709/321 |
| 2004/0239984 A1* | 12/2004 | Ishii et al. .................... 358/1.15 |
| 2005/0071524 A1* | 3/2005 | Liu et al. ......................... 710/15 |
| 2006/0005064 A1* | 1/2006 | Graham et al. .................. 714/2 |
| 2007/0216925 A1* | 9/2007 | Nakamura ................... 358/1.13 |

FOREIGN PATENT DOCUMENTS

JP A-2007-160525 6/2007

* cited by examiner

*Primary Examiner* — Vincent Rudolph
(74) *Attorney, Agent, or Firm* — Oliff PLC

(57) ABSTRACT

An image forming device includes a storage unit that stores a program to use the device itself as image data of a virtual recording medium; and a controller including: a detecting unit that detects connection of another device using the device itself; a transmitting unit that transmits, if the connection is detected by the detecting unit, discriminates an information of the device itself to another device using the device itself; a receiving unit that receives a response information based on the discriminating information; and wherein another device using the device itself is available to access the image data of the virtual recording medium on the basis of the response information.

8 Claims, 6 Drawing Sheets

FIG. 3A

PRINTER DEVICE ID SIDE

MFG:X, CMD:TEXT:MDL:XYZ1000 ;CLS:PRINTER;

FIG. 3B

CD-ROM DEVICE ID SIDE

MFG:X, CMD:TEXT:MDL:XYZ1000-CD;CLS:CDROM;

*FIG. 6A*  WHERE VIRTUAL CD-ROM
IMPLEMENTING FUNCTION IS VALID

| Function Menu | |
|---|---|
| Virtual CD-ROM | Valid |

*FIG. 6B*  WHERE VIRTUAL CD-ROM
IMPLEMENTING FUNCTION IS INVALID

| Function Menu | |
|---|---|
| Virtual CD-ROM | Invalid |

*FIG. 7*

Installing of Printer Driver

New Printer has been connected.
  Model Name: xxx
Do you install printer driver for this printer?

OK    CANCEL

IMAGE FORMING DEVICE, IMAGE FORMING SYSTEM AND COMPUTER READABLE MEDIUM FOR INSTALLING RELATED SOFTWARE TO ANOTHER DEVICE

CROSS-REFERENCE TO RELATED APPLICATION

This application is based on and claims priority under 35 USC 119 from Japanese Patent Application No. 2008-203527 filed Aug. 6, 2008.

BACKGROUND

1. Technical Field

This invention relates to an image forming device, an image forming system and an install program.

2. Related Art

Generally, for an information processing device such as a personal computer connected to a printer as an image forming device through a USB (Universal Serial Bus), in installing a program such as a printer driver necessary to use the printer, in many cases, it is installed by using a CD-ROM for program installing attached to the printer at the time of shipping, or by accessing a network such as the Internet on the side of the personal computer to download the program such as the printer driver.

However, in the installing method using the CD-ROM for program installing, in case the CD-ROM is lost or damaged, it is necessary to accept the CD-ROM from the manufacturer again; thus, as the case may be, the program installing in the personal computer could not be done instantly.

In the installing method by downloading the program through the network, a network connecting environment is indispensable; thus in case connection to the Internet cannot be done, as the case may be, the program could not be installed.

SUMMARY

According to an aspect of the invention, an image forming device includes a storage unit that stores a program to use the device itself as image data of a virtual recording medium; and a controller including: a detecting unit that detects connection of another device using the device itself; a transmitting unit that transmits, if the connection is detected by the detecting unit, discriminates an information of the device itself to another device using the device itself; a receiving unit that receives a response information based on the discriminating information; and wherein another device using the device itself is available to access the image data of the virtual recording medium on the basis of the response information

BRIEF DESCRIPTION OF THE DRAWINGS

Exemplary embodiments of the invention will be described in detail based on the following figures, wherein:

FIGS. 3A and 3B are views for explaining an example of a printer device ID and a CD-ROM device ID;

FIGS. 6A and 6B are views showing a typical exhibition of virtual CD-ROM implementing function selection on the operating panel; and FIG. 7 is a view for explaining a typical exhibition of an instruction of installing a printer driver.

DETAILED DESCRIPTION

Figure 1:
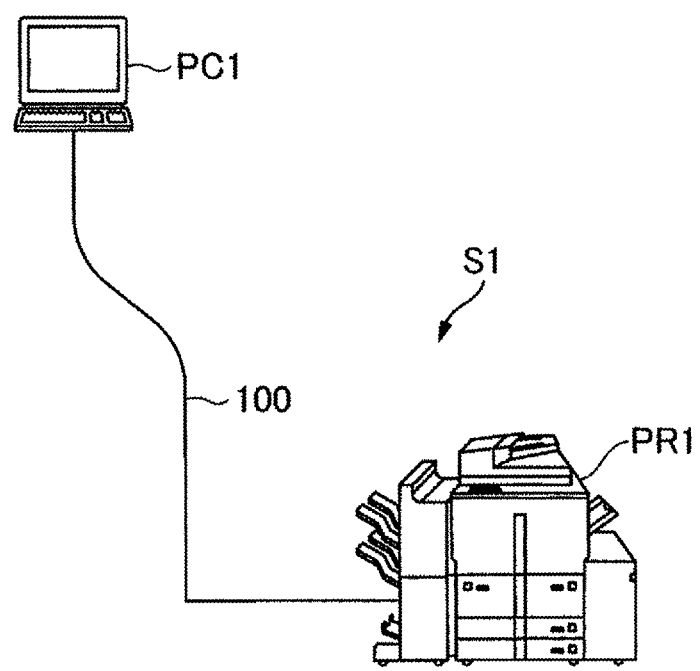
FIG. 1 is a schematic diagram showing the configuration of an image forming system S1 according to an exemplary embodiment of this invention.

Hereinafter, referring to the drawings, an explanation will be given of an exemplary embodiment which is an example of this invention. Now, in the attached drawings, like reference numerals refer to like elements and the repeated explanation will be avoided. Since the explanation made herein is directed to the best mode for carrying out this invention, this invention should not be limited to this best mode.

Referring to FIGS. 1 to 7, an explanation will be given of an image forming system S1 according to an exemplary embodiment of this invention.

The image forming system S1, as shown in FIG. 1, includes a printer PR1 serving as an image forming device, a cable 100 connected through an input/output interface such as USB, and a personal computer PC1 serving as an information processing device.

In this exemplary embodiment, a single printer PR1 and a single information processing device PC1 are connected, but without being limited to such a case, two or more printers and two or more information processing devices may be connected.

Further, in this exemplary embodiment, it is assumed that the printer PR1 is a laser system of printer using toner as a color material, but without being limited to such a case, this invention may be applied to a full-color printer, a composite machine or an ink-jet system of printer.

Figure 2:
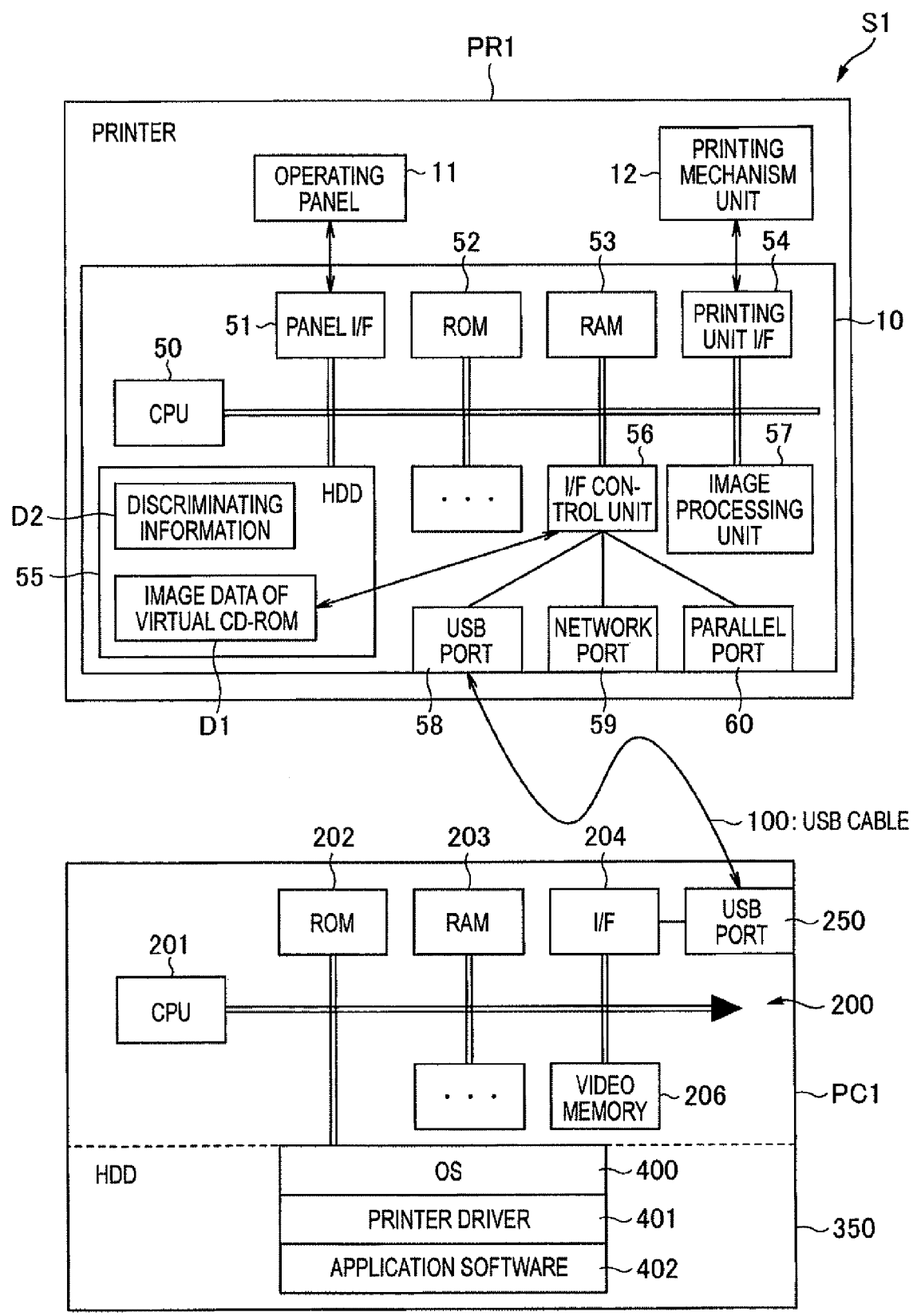
FIG. 2 is a block diagram showing the configuration of an image forming system S1 according to an exemplary embodiment of this invention.

FIG. 2 shows a typical configuration of the printer PR1 and personal computer PC1.

The printer PR1 includes a control device 10 constructed of a microcomputer for various kinds of arithmetic processing, an operating panel 11 constructed of a liquid crystal display device for displaying various kinds of information and a printing mechanism unit 12 for making an image on a printing sheet.

The control device 10 includes a CPU 50 for executing arithmetic processing; an interface 51 for outputting displayed data to the operating panel 11; a ROM 52 for storing various programs; a RAM 53 which is used as a working area of the CPU 50; an printing unit interface 54 for outputting image data to the printing mechanism unit 12; a hard disk drive (HDD) 55 for storing various kinds of data; an interface control unit 56 for controlling a USB port 58, a network port 59 and a parallel port 60; and an image processing unit 57 for processing the image data.

Stored in a predetermined area of the hard disk drive 55 are image data D1 of a virtual CD-ROM serving as a virtual recording medium accommodating the program such as the printer driver of the printer PR1 and discriminating information D2 of the printer PR1.

Now, the virtual CD-ROM will be explained.

The virtual CD-ROM refers to a general term of the technique which virtually handles a file on the hard disk as the CD-ROM set in a CD-ROM drive.

By previously copying the contents of the CO-ROM on the hard disk drive, even if there is not the CD-ROM, as occasion demands, it can be assumed as if the CD-ROM were set in the virtual CD-ROM drive.

Namely, from the OS or application software on the side of the personal computer PC1, the virtual CD-ROM drive can be also handled in the same manner as a physical drive. Thus, the software operates as if it were read from a real CD-ROM drive.

Some kinds of software do not operate if they are not start up from the CD-ROM. Therefore, the technique of the virtual CD-ROM can be conveniently adopted when such software is started up without using the CD-ROM.

More specifically, for example, even if the CD-ROM for installing the printer driver attached at the time of shipping of the printer PR1 is lost or damaged to be disabled, without taking the labor and time of getting a substitute from the manufacturer, the installing processing can be done instantly, thereby improving user's convenience.

For the manufacturer of the printer PR1, by storing the image data D1 of the virtual CD-ROM for installing in the hard disk drive 55, attachment of the CD-ROM can be done without, thereby leading to an advantage of cost reduction.

Further, unlike the case of the system of downloading the printer driver through the network as the Internet on the side of the personal computer PC1, connection to the network is not indispensable. Thus, even if there is not the network connecting environment, the installing processing can be smoothly done.

It should be noted that dedicated software and a data file having a specific format therefor are required in order to employ the above virtual CD-ROM.

Specifically, if the data are copied from an optical medium such as CD-ROM to another medium simply in units of files, the information on the sectors of the optical medium to which the data belong, physical information on a disk and information on volume labels will be lost.

On the other hand, by using an image file saving function loaded in dedicated writing software, the data can be saved with specific information such as information structure or physical information of the optical medium being held.

Further, image data (also named as a disk image or an image file) refers to the data in which complete contents and structure of a file system are stored in a single file.

The virtual disk image generally employed includes an ISO system or a standard ISO system (9660 image: system which can be created by many CD/DVD writing tool and permits an original CD/DVD to be restored from the image).

Next, an explanation will be given of the discriminating information D2 stored in the hard disk drive 55.

The discriminating information D2 is constructed of a discriminating code allotted to the same kind of printers (printer device ID for discriminating the printer and CD-ROM device ID for discriminating the CD-ROM).

The printer device ID, although not be particularly limited, may be data having the format based on a predetermined communication protocol as illustrated in FIG. 3($a$).

The CD-ROM device ID, although not be particularly limited, may be data having the format as illustrated in FIG. 3($b$).

By discriminating these printer device ID and CD-ROM device ID by the personal computer PC1, for example, if the connection to the same printer is to be done twice or more, it can be decided that the processing of installing the printer driver is not necessary, or that the program corresponding the pertinent personal computer PC1 has been stored.

Next, referring to FIGS. 2 and 4, an explanation will be given of the structure of the personal computer PC1.

Figure 4:
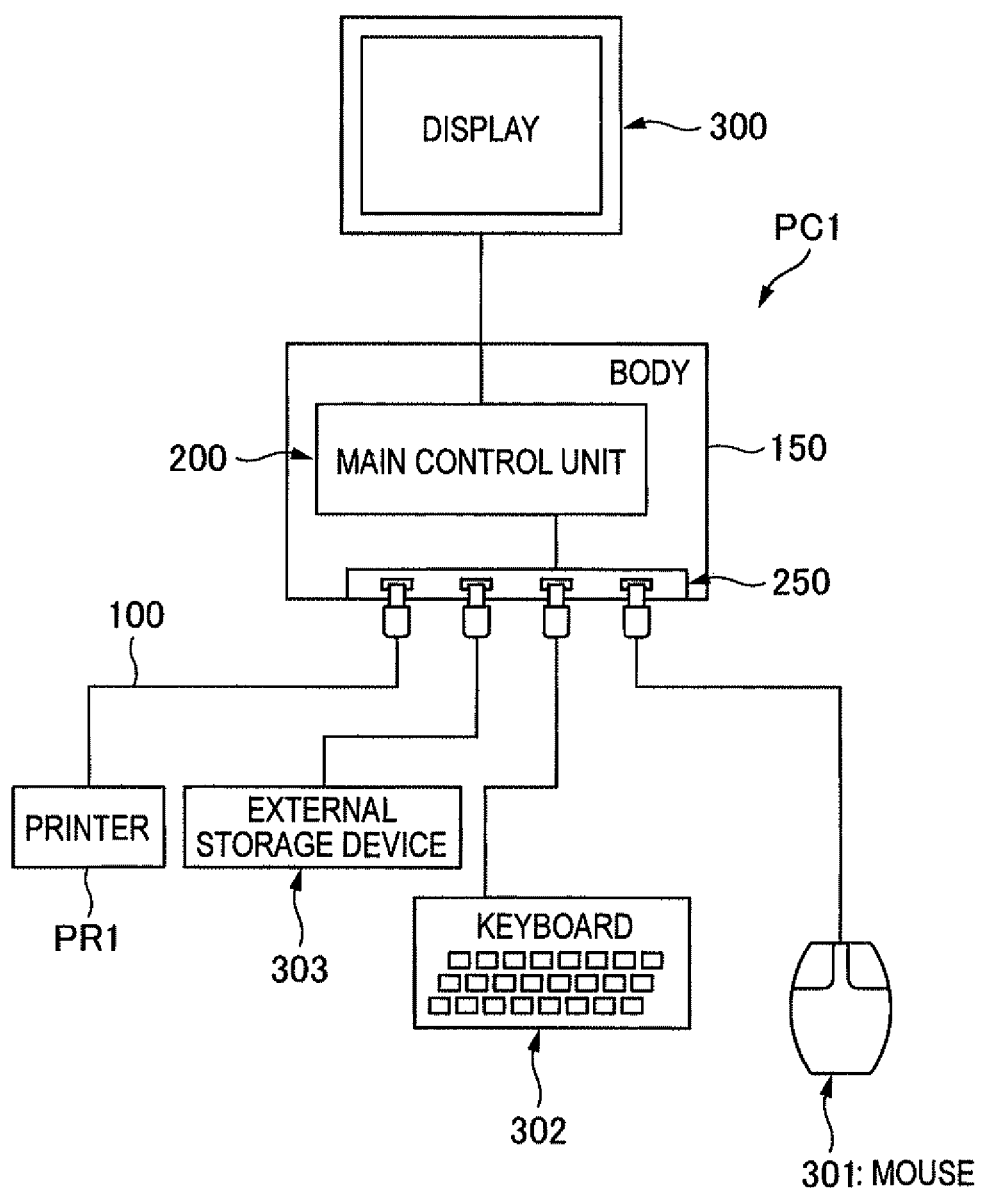
FIG. 4 is a view showing a typical configuration of a personal computer PC1.

The personal computer PC1, as shown in FIG. 4, includes a personal computer body 150 incorporating e.g. a main control unit 200, a display 300 constructed of a liquid crystal monitor which is connected to the body 150 to display various kinds of information, a USB port 250, etc.

Through the USB port 250 having plural of USB connecting terminals, the personal computer PC1 is connected to a mouse 301 serving as a pointing device, a keyboard serving as an input unit and an external storage device 303 formed of a hard disk drive and a printer PR1.

The main control unit 200 includes a CPU 201 for executing various kinds of arithmetic processing; a ROM 202 storing various kinds of programs such as BIOS; a RAM 203 used as a working area of the CPU 201; an interface 204 to which the USB port 250 is connected; a hard disk drive (HDD) 350 in which various programs such as an OS (Operation System) 400, a printer driver 401, an application software program 402 and data are stored; and a video memory 206 used as an image processing area.

The interface 204 of the main control unit 200 is adapted to monitor the USB port 250 by execution of a predetermined program by the CPU 201 so that when the USB cable connected to the printer PR1 is connected to any USB terminal of the USB port 250, its connecting status can be detected.

When the connecting status is detected, the printer device ID and the CD-ROM device ID as illustrated in FIG. 3 are received from the printer PR1 side; if it is determined that the printer PR1 connected is a printer still not installed with the printer driver, the hard disk drive 55 of the printer PR1 is accessed.

Further, using the image data D1 of the virtual CD-ROM of the hard disk drive 55, the processing of installing the program such as the printer driver into a predetermined area of the hard disk drive 350 of the personal computer PC 1 side is done.

Figure 5:
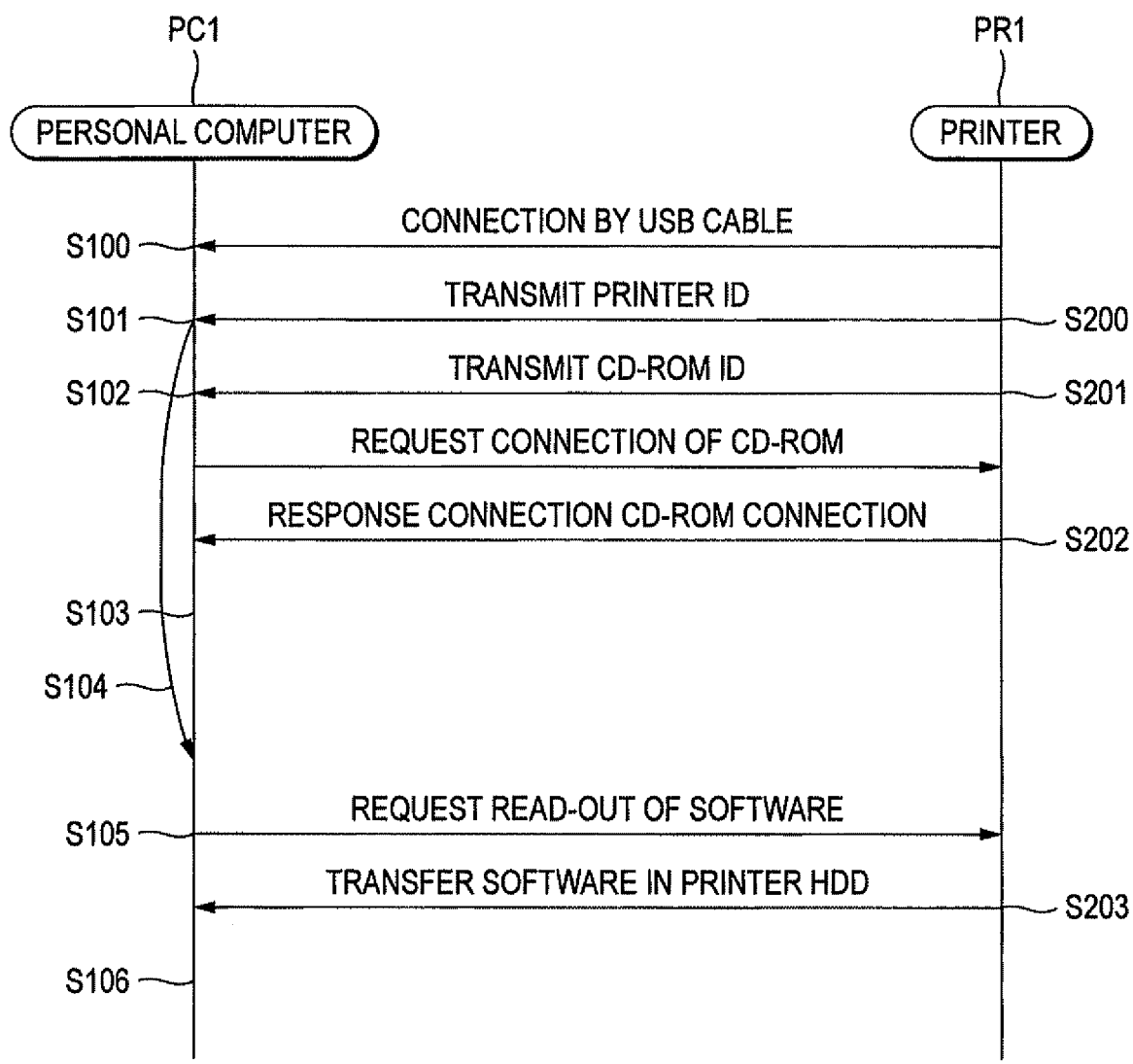
FIG. 5 is a flowchart showing the processing procedure of installing processing of a printer driver.

Now, referring to the flowchart shown in FIG. 5, an explanation will be given of the processing procedure between the printer PR1 and the personal computer PC1.

First, if the printer PR1 is connected to the personal computer PC1 through the USB cable 100, in the personal computer PC1, "plug-and-play" processing of the USB is started (step S100).

Now, the "plug-and-play" refers to the function that when the USB cable with any device connected is inserted in the USB connector, this is recognized automatically.

On the printer PR1 side, "plug-and-play" response processing of the USB is started so that the printer ID as illustrated in FIG. 3($a$) is transmitted to the personal computer PC1.

Thus, in the personal computer PC1, printer connecting processing is started (step S101).

Further, from the printer PR1, the CD-ROM device ID as illustrated in FIG. 3($b$) is transmitted to the personal computer PC 1.

Thus, CD-ROM connecting processing for the virtual CD-ROM is started (step S102), In the printer PR1, processing of virtual CD-ROM connecting function additional response is executed (step S201).

By the processing of the virtual CD-ROM connecting function additional response, a file system is started which is accessible to the image data D1 of the virtual CD-ROM drive of the hard disk drive 55 within the printer PR1 in the same manner as to an ordinary CD-ROM drive.

If the virtual CD-ROM implementing function is valid, on the operating panel 11 of the printer PR1, for example, "virtual CD-ROM is valid" for a "function menu" (FIG. 6($a$)).

If the virtual CD-ROM implementing function is invalid, for example, "virtual CD-ROM is invalid" for the "function menu" (FIG. 6(b)). In this case, only the USB printer device ID is notified.

Next, from the personal computer PC1 side, a CD-ROM connecting request is sent to the printer PR1. In response to this, the printer PR1 places the image data D1 of the virtual CD-ROM drive of the hard disk drive 55 in a state accessible by "read-only" from the personal computer PC1 (step S202).

The printer PR1 issues a CD-ROM connecting response to the personal computer PC1.

Thus, the personal computer PC1 completes the CD-ROM connecting processing which permits the image data D1 of the virtual CD-ROM drive of the hard disk drive 55 to be viewed (handled) as the ordinary CD-ROM drive (step S103).

Further, coming with the start of the printer connecting processing in step S101, the personal computer PC1 requires installing of the printer driver from a user (step S104).

For example, as illustrated in FIG. 7, an exhibition of urging the user to install the printer driver is made on the display 300 of the personal computer PC1.

Exemplarily illustrated in FIG. 7 are exhibitions "A new printer has been connected", "Model name", message "Do you install the printer driver for this printer?", "OK" and "Cancel".

On the basis of these exhibitions, the user gives an instruction by mouse-clicking the exhibition of "OK" if installing is permitted, or the exhibition of "Cancel" if installing is not executed.

Next, on the instructing screen as illustrated in FIG. 7, if installing of the printer driver is permitted, the processing of installing the printer driver is executed on the basis of the operation specification of the OS (Operating System) installed in the personal computer PC1 (step S105).

By the processing of installing the printer driver, from the personal computer PC1 side, a software read-out request is issued for the printer PR1.

In response to the request, the printer PR1 transmits the software (printer driver) to the personal computer PC1 (step S203).

In the personal computer PC1, the image data D1 of the virtual CD-ROM drive of the hard disk drive 55 recognized as the ordinary CD-ROM in step S103 is selected as e.g. an "F drive".

If there is any application software program other than the printer driver, it will be installed in the same manner, thereby completing the processing (step S106).

Thus, the printer PR1 becomes usable in the personal computer PC1.

In this way, in accordance with the image forming system S1 according to this exemplary embodiment, even if the CD-ROM for installing the printer driver attached at the time of shipping of the printer PR1 is lost or damaged to be disabled, without taking the labor and time of getting a substitute from the manufacturer, the installing processing can be done instantly, thereby improving user's convenience.

Even when the CD-ROM attached is kept, in installing the printer driver, the user can do without the work of setting the CD-ROM in the CD-ROM drive of the personal computer PC1, thereby improving the user's convenience.

Further, for the manufacturer of the printer PR1, by storing the image data D1 of the virtual CD-ROM for installing for the printer driver in the hard disk drive 55, it is possible to omit attachment of the CD-ROM itself for the printer driver, thereby giving an advantage of cost reduction.

Further, unlike the case of the system of downloading the printer driver through the network as the Internet on the side of the personal computer PC1, connection to the network is not indispensable. Thus, even if there is not the network connecting environment, the installing processing can be smoothly done.

Hitherto, the concrete explanation has been given of the invention accomplished by the inventor on the basis of the exemplary embodiment. However, the exemplary embodiment disclosed in this specification is exemplary in all points so that this invention should not be limited to the technique disclosed. Specifically, the technical scope of this invention should not be construed limitedly on the basis of the explanation of the above exemplary embodiment, but construed on the basis of the description of the scope of claims. Any technique equivalent to the technique described in the claims and any change in the claims should be included in this invention.

For example, after the printer driver and others have been installed, the virtual CD-ROM in the connected state can be removed by the operation of removing hardware included in the OS.

For the personal computer PC1 which has once connected the printer PR1 to complete installing of the printer driver and others, in order that the virtual CD-ROM is not connected again, setting of "valid" or "invalid" may be permitted by the setting menu of the operating panel 11 of the printer PR1 side.

What is claimed is:
1. An image forming device comprising:
 a storage unit that stores a program other than a printer driver to use the device itself as image data of a virtual recording medium; and
 a controller including:
  a detecting unit that detects a connection of another device using the device itself;
  a transmitting unit that transmits, if the connection is detected by the detecting unit, a discrimination information of the device itself, the discriminating information including a device identifier and an image data identifier, to another device using the device itself;
  the image data identifier identifying the image data of the virtual recording medium to the other device; and
  a receiving unit that receives a response information based on the discriminating information; wherein
  another device using the device itself is available to access the image data of the virtual recording medium on the basis of the response information,
  the image data of the virtual recording medium is stored as a disk image file, the disk image file constituting a single file and including complete contents and structure of a file system, and
  a type of the disk image file is an ISO system or a standard ISO system.

2. The image forming device according to claim 1, wherein the image data of the virtual recording medium is the image data of a virtual CD-ROM.

3. The image forming device according to claim 1, wherein the detecting unit detects the connection on the basis of presence or absence of communication through an input/output interface.

4. The image forming device according to claim 1, further comprising
 a communicating unit that is capable of communicating with an external device; and
 a confirming unit that confirms a version of the program to use the device itself through the communicating unit, wherein the program or differential data of another version received through the communicating unit according to a result confirmed by the confirming unit is stored in the storage unit.

5. An image forming system comprising:

at least one image forming device according to claim 1, and at least one information processing device connected to the image forming device through a communicating unit.

6. An image forming system according to claim 5, wherein the information processing device includes an executing unit that executes an installing processing of the program provided to use the image forming device on the basis of the image data of the virtual recording medium outputted from an outputting unit.

7. A non-transitory computer readable medium storing a program other than a printer driver causing a computer to execute a process for installing the program, the process comprising:

detecting a connection of another device using the image forming device;

transmitting, in a case that the connection is detected in the detecting, a discriminating information of the image forming device, the discriminating information including a device identifier and an image data identifier, to another device using the image forming device; and receiving a response information based on the discriminating information; wherein another device using the image forming device is available to access image data of a virtual recording medium on the basis of the response information, the image data of the virtual recording medium is stored as a disk image file, the disk image file constituting a single file and including complete contents and structure of a file system, the image data identifier identifies the image data of the virtual recording medium to the other device, and a type of the disk image file is an ISO system or a standard ISO system.

8. An image forming device comprising:

a storage unit that stores a program other than a printer driver to use the device itself as image data of a virtual recording medium; and a controller including:

a detecting unit that detects a connection of another device using the device itself;

a transmitting unit that transmits, if the connection is detected by the detecting unit, a discrimination information of the device itself, the discriminating information including a device identifier and an image data identifier, to another device using the device itself;

the image data identifier identifying the image data of the virtual recording medium to the other device;

the discrimination information including at least a printer device ID and a CD-ROM device ID; and a receiving unit that receives a response information based on the discriminating information; wherein another device using the device itself is available to access the image data of the virtual recording medium on the basis of the response information, the image data of the virtual recording medium is stored as a disk image file, the disk image file constituting a single file and including complete contents and structure of a file system, and a type of the disk image file is an ISO system or a standard ISO system.

\* \* \* \* \*